(12) United States Patent
Eli Eli et al.

(10) Patent No.: US 9,987,823 B2
(45) Date of Patent: Jun. 5, 2018

(54) COMPOSITE STRUCTURAL MEMBER

(71) Applicant: Airbus Operations Limited, Bristol (GB)

(72) Inventors: Matthew Eli Eli, Bristol (GB); David Brian, Bristol (GB); Enzo Cosentino, I, Bristol (GB); James Lloyd, Bristol (GB); Filipe Almeida, Bristol (GB); Christopher David Burleigh, Bristol (GB)

(73) Assignee: Airbus Operations Limited, Bristol (GB)

( * ) Notice: Subject to any disclaimer, the term of this patent is extended or adjusted under 35 U.S.C. 154(b) by 181 days.

(21) Appl. No.: 14/923,280

(22) Filed: Oct. 26, 2015

(65) Prior Publication Data

US 2016/0046097 A1   Feb. 18, 2016

Related U.S. Application Data

(62) Division of application No. 13/576,217, filed as application No. PCT/GB2011/050620 on Mar. 28, 2011, now Pat. No. 9,168,702.

(30) Foreign Application Priority Data

Mar. 30, 2010 (GB) .................................. 1005308.0

(51) Int. Cl.
| | | |
|---|---|---|
| *B32B 5/26* | (2006.01) | |
| *B29C 70/22* | (2006.01) | |
| *B29D 99/00* | (2010.01) | |
| *B64C 1/06* | (2006.01) | |
| *B64C 1/12* | (2006.01) | |
| *B64C 3/18* | (2006.01) | |
| *B64C 3/26* | (2006.01) | |
| *B32B 5/12* | (2006.01) | |
| *B29L 31/30* | (2006.01) | |

(52) U.S. Cl.
CPC ............... *B32B 5/26* (2013.01); *B29C 70/22* (2013.01); *B29D 99/0014* (2013.01); *B32B 5/12* (2013.01);
(Continued)

(58) Field of Classification Search
CPC ...................................................... B29C 70/22
(Continued)

(56) References Cited

U.S. PATENT DOCUMENTS 4,606,961 A   8/1986 Munsen et al.
5,690,474 A   11/1997 Byrnes et al.
(Continued)

FOREIGN PATENT DOCUMENTS

DE   102007036510   1/2009
EP   1 547 756   6/2005
(Continued)

OTHER PUBLICATIONS

International Search Report for PCT/GB2011/050620, dated Aug. 2, 2011.
(Continued)

*Primary Examiner* — Brent T O'Hern
(74) *Attorney, Agent, or Firm* — Nixon & Vanderhye P.C.

(57) ABSTRACT

A method of manufacturing a composite structural member including laying up a stack of fiber reinforced laminate plies, wherein at least one of the plies is laid up as discrete first and second ply portions, and the fibers of the second portion have a different characteristic from those of the first portion. Also, a composite structural member manufactured according to the method.

10 Claims, 7 Drawing Sheets

(52) U.S. Cl.
CPC ............... *B64C 1/064* (2013.01); *B64C 1/12* (2013.01); *B64C 3/182* (2013.01); *B64C 3/26* (2013.01); *B29L 2031/3085* (2013.01); *B32B 2605/18* (2013.01); *Y02T 50/433* (2013.01); *Y10T 428/24182* (2015.01)

(58) Field of Classification Search
USPC ........................................................ 428/105
See application file for complete search history.

(56) References Cited

U.S. PATENT DOCUMENTS

| | | |
|---|---|---|
| 2006/0049552 A1 | 3/2006 | Fish |
| 2009/0082892 A1 | 3/2009 | Tang et al. |
| 2009/0261199 A1 | 10/2009 | McCarville et al. |
| 2009/0263618 A1 | 10/2009 | McCarville et al. |

FOREIGN PATENT DOCUMENTS

| | | | |
|---|---|---|---|
| EP | 1547756 A1 * | 6/2005 | ........... B29C 70/205 |
| GB | 2 110 736 | 6/1983 | |
| JP | 2009-539702 | 11/2009 | |
| WO | 2005058591 | 6/2005 | |
| WO | 2008054499 | 5/2008 | |
| WO | 2010060824 | 6/2010 | |

OTHER PUBLICATIONS

Written Opinion of the International Searching Authority for PCT/GB2011/050620, dated Aug. 2, 2011.

UK Search Report for GB Application No. 1005308.0, dated Jul. 28, 2010.

* cited by examiner

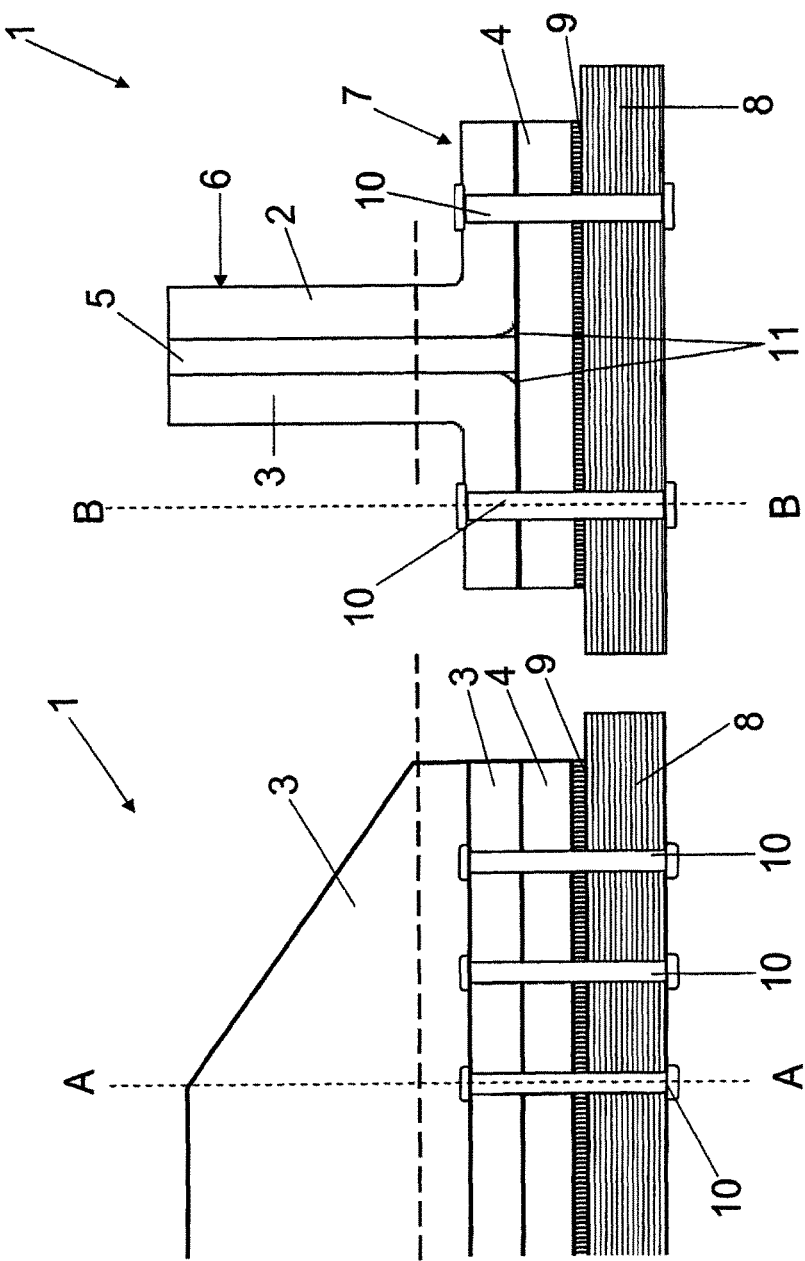

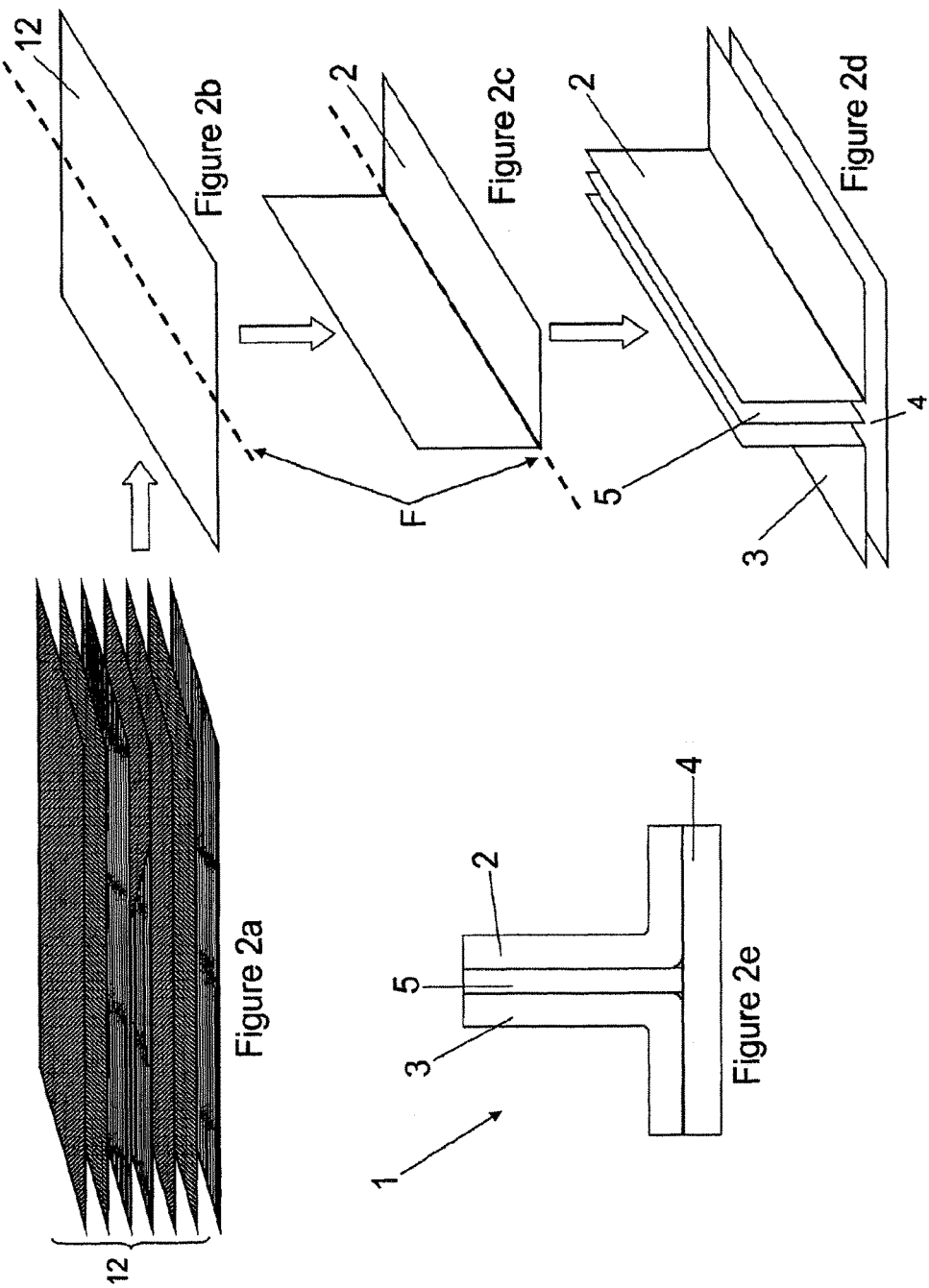

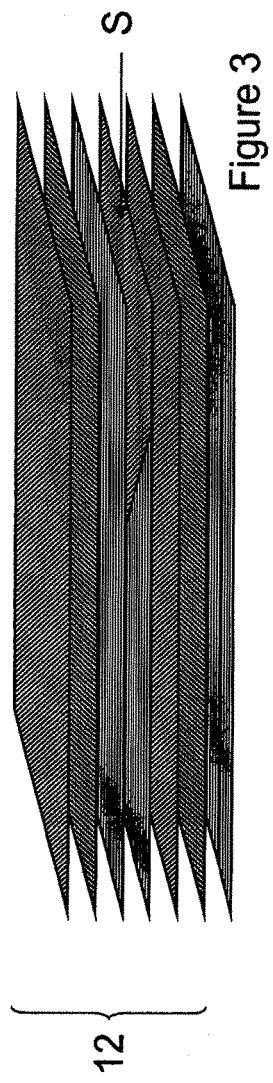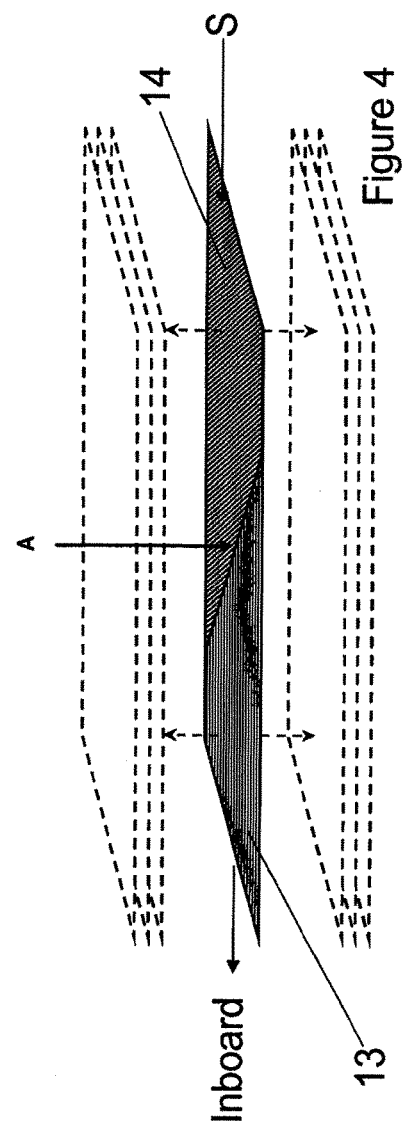

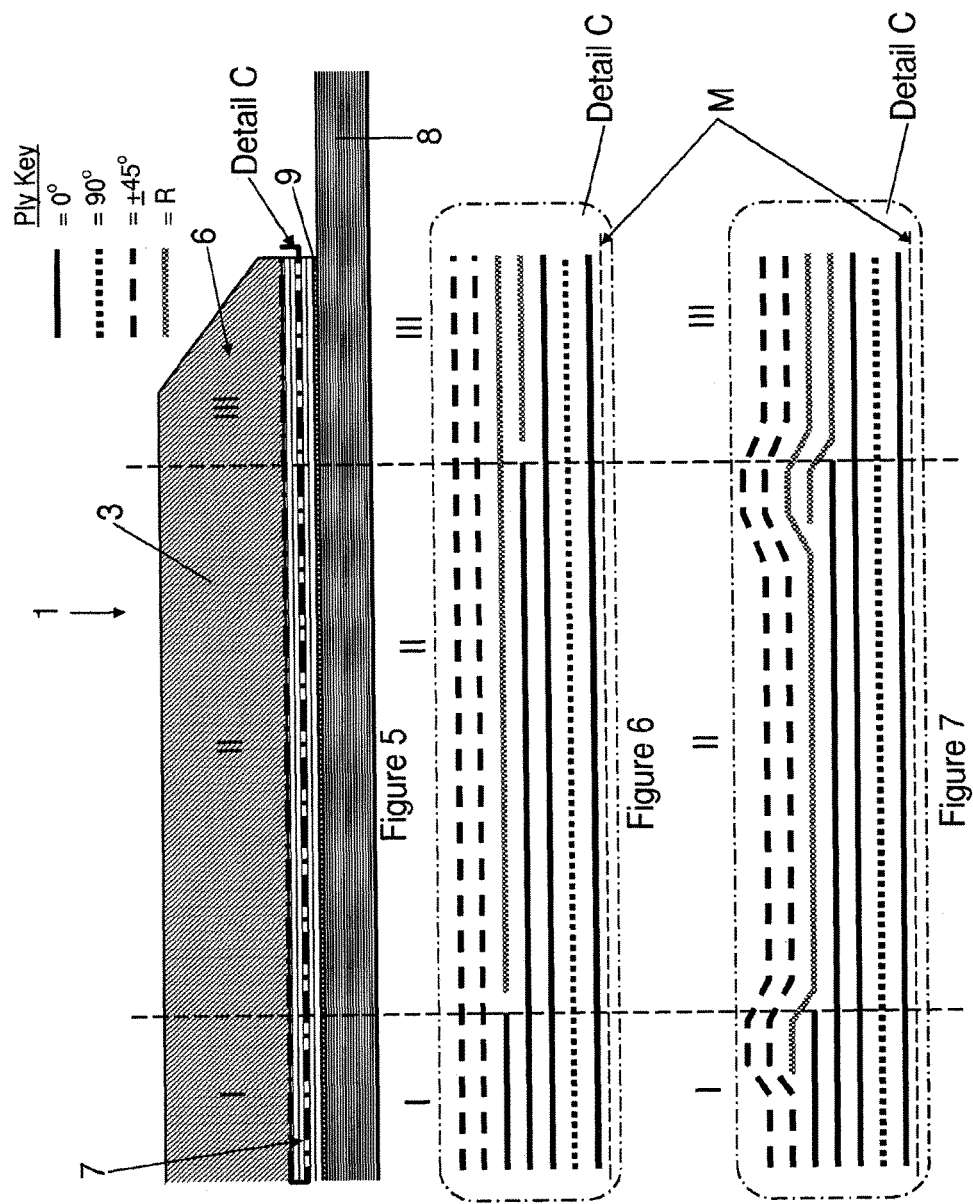

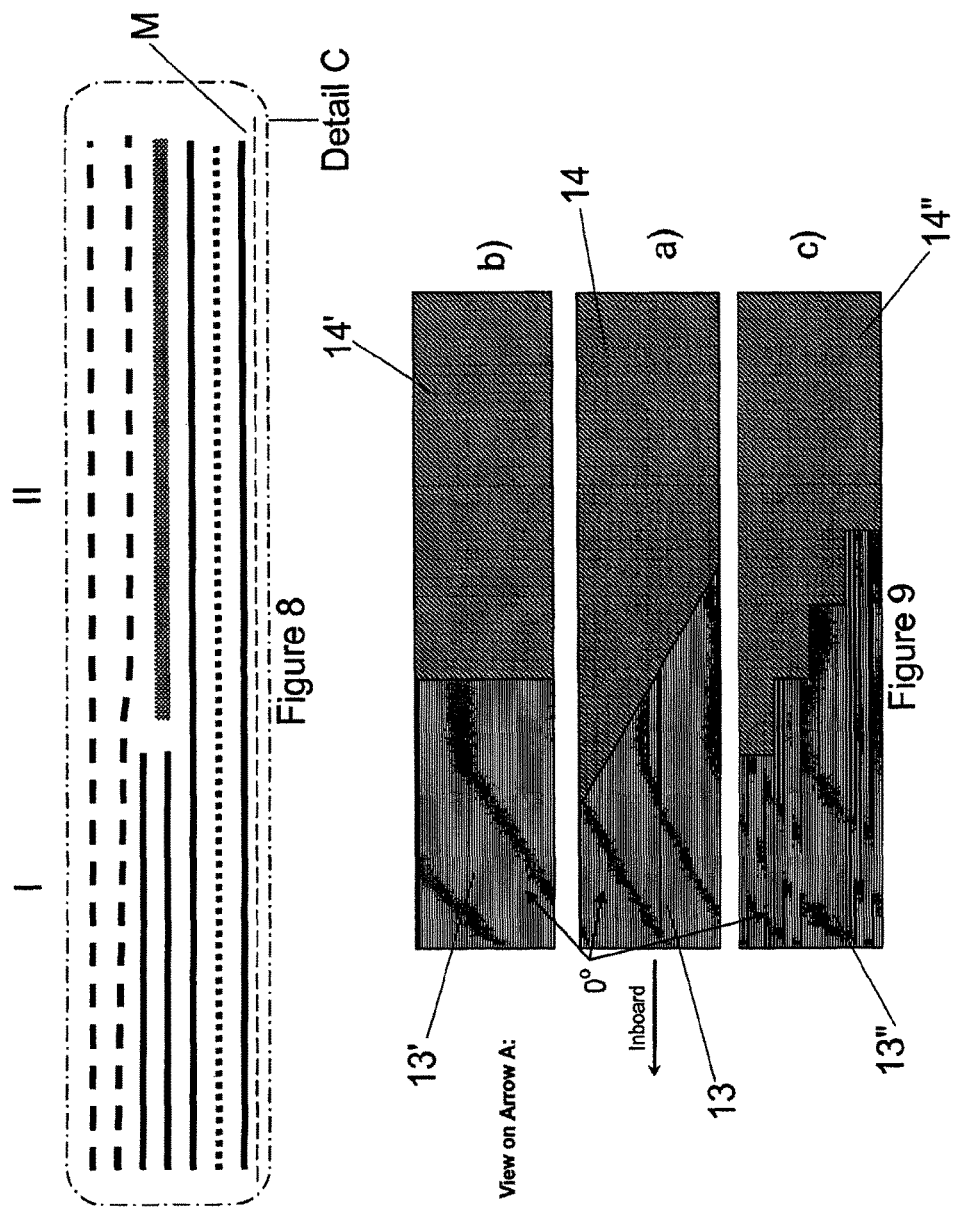

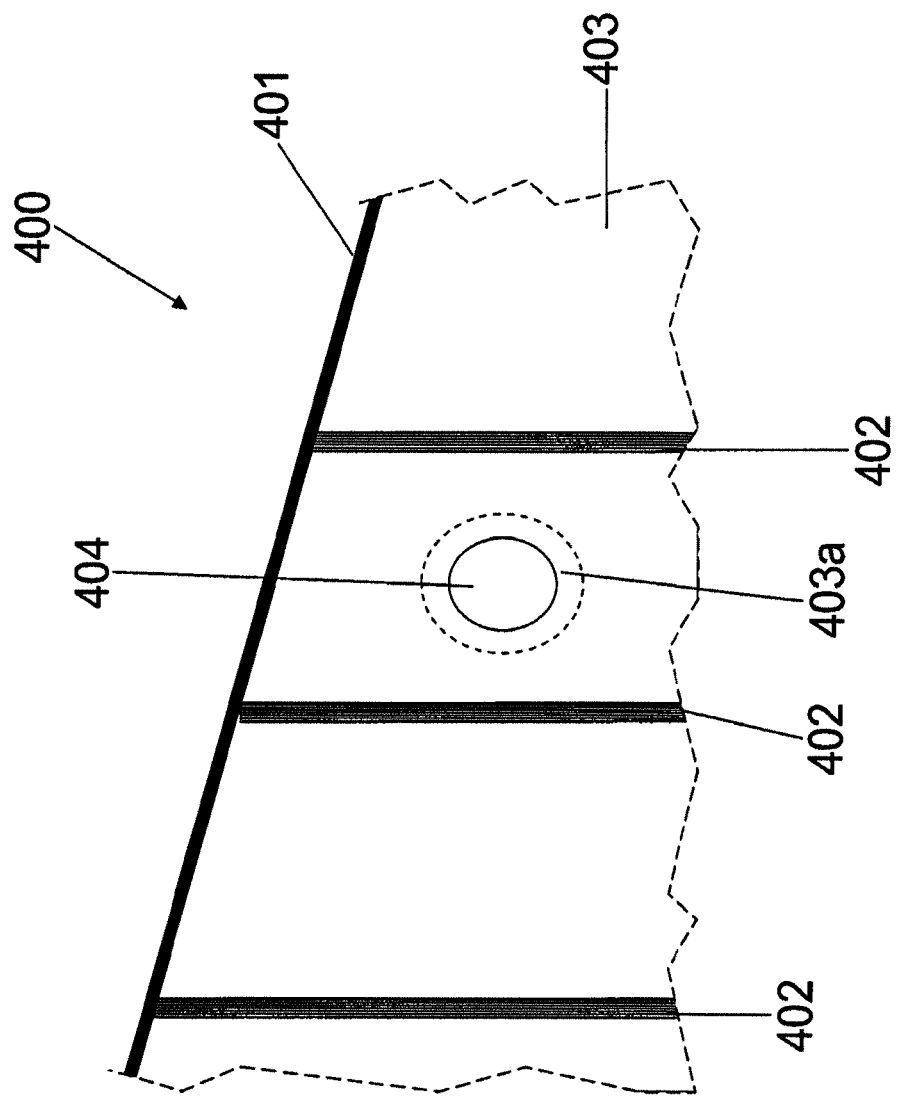

COMPOSITE STRUCTURAL MEMBER

RELATED APPLICATIONS

This application is a divisional of U.S. patent application Ser. No. 13/576,217, filed Jul. 31, 2012 (U.S. Pat. No. 9,168,702), which is the U.S. national phase of International Application No. PCT/GB2011/050620, filed 28 Mar. 2011, which designated the U.S. and claims priority to GB Application No. 1005308.0, filed 30 Mar. 2010, the entire contents of each of these applications are incorporated by reference.

FIELD OF THE INVENTION

The present invention relates to a method of manufacturing a composite structural member, and to a composite structural member so formed.

BACKGROUND OF THE INVENTION

In many structures, panels have attached reinforcing structural members to improve buckling stability. In aircraft, a skin panel (e.g. a wing cover) may have reinforcing structural members (e.g. stringers). The reinforcing structural members meet with various obstructions and so need to be "run-out", or terminated. The problem of transferring load between the reinforcing member and the skin panel that it is reinforcing in the run-out region is well known. A bond line is typically used to attach the stringer flange to the skin and may be used in conjunction with bolting to transfer load into the skin.

Conventional metallic stringers can be machined from a given cross section (e.g. 'I', 'T', 'L') to a flat extended flange at the termination. The stringer can have an initial web taper (i.e. of reducing web height) to facilitate load transfer by providing gradual decrease of transverse bending and axial stiffness. The attached flat extended flange renders the stringer tip more compliant with the skin when it is bent due to the eccentricity of the in-plane loads. The effect of lowering the neutral axis of the stringer closer to the skin and gradually reducing the stiffness of the stringer through significantly reducing the cross-sectional area, and second moment of area, at the run out, is to gradually transfer load through bonding and/or bolting.

Composite stringers usually comprise a back-to-back interface in the central web section but these cannot be run out in this ideal fashion, as a minimum attachment height must remain above the noodle (the fiber filler in the cleft at the interface) to prevent web cracking under load. This therefore limits the lowering of the neutral axis and cross-sectional area reduction. As a result, geometric tapering and hence load transfer in the stringer termination region, tends to be relatively abrupt with poor compliance with the skin under bending.

Bonding or co-curing of the reinforcing member to the skin aggravates this situation; due to high bond line stiffness and peak shear loads at the attached flange termination position. These bonded joints also tend to be susceptible to peeling failures. These factors contribute to cause premature cracking, peeling and disbond growth in these regions. This can be exacerbated in composite panels if there is significant stiffness mismatch between the reinforcement member and the skin. Such issues are important to overcome in order to realise potential weight saving benefits of co-curing/co-bonding structures as well.

A typical run-out for a composite 'T' stringer comprises an angled taper of the web section until the residual height is enough to ensure an adequate bonded area between back-to-back web sections. As this geometric tapering may not be sufficient to terminate a stringer at its desired location, another structural member (e.g. an aircraft wing rib) inboard of the desired termination location may be used to help transfer loads more effectively, delaying crack initiation/disbond. As a result of this earlier termination, the skin thickness must be increased following the stringer run-out giving rise to a weight penalty. Furthermore, additional supporting structural members may require modification to account for new loads, and repair of the run-out region becomes more complicated.

Further geometric modifications in the stringer termination region are possible but these have associated tooling, tolerance and manufacturing complexities. It is therefore desirable to make the composite stringer more compliant in the termination region though non-geometric modifications. Additionally, or alternatively, it is desirable to make a stringer more compliant at one or more locations in-board of the run-out region. More generally, it is desirable to make a region of any composite structural member more compliant through non-geometric modifications.

SUMMARY OF THE INVENTION

A first aspect of the invention provides a method of manufacturing a composite structural member, comprising the step of laying up a stack of fiber reinforced laminate plies, wherein at least one of the plies is laid up as discrete first and second ply portions, and the fibers of the second portion have a different characteristic from those of the first portion, and wherein the second portion extends up to an edge of the structural member and the first portion is disposed inboard of the edge.

A further aspect of the invention provides a composite structural member manufactured according to the method of the first aspect.

The invention is advantageous in that a portion of a ply, or group of plies, is substituted for a ply portion having a different fiber characteristic. The ply containing the substitution may be provided between continuous plies in the stack. The fiber characteristic may be its modulus, orientation, and/or material. For example, a ply having an orientation of 0 degrees may have a substituted portion containing fibers of +/−45 degrees so as to beneficially reduce axial stiffness in the substituted region of the structural member. Alternatively, the substituted ply portion could have fibers of lower modulus but the same orientation as those of the remainder of the ply to achieve the same effect of lowing the axial stiffness in the substituted region. The first and second ply portions may have fibers of the same material (e.g. carbon Intermediate Modulus (IMS) for one portion and carbon High Tensile Strength (HTS) for the other), or the ply portions may have fibers of different materials (e.g. carbon and glass) so as to achieve the reduction in axial stiffness in the substituted region.

Preferably, the plies of the first and second portions are of the same thickness for ease of manufacture. However, it is contemplated that a group of adjacent plies could be substituted for a group of plies of different number so as to accommodate a difference in thickness between individual plies of the first and second portions. For example, four 0.125 mm thick plies may be provided in the first region and two 0.25 mm thick plies may be provided in the second region so that no local thickness variation occurs.

Adjacent edges of the first and second portions may be abutting to help ensure there are no local thickness variations. However, efficient load transfer within the laminate may be achieved by overlapping adjacent edges of the first and second portions. The overlapping distance can be controlled to minimise the impact on local thickness changes if required to achieve simplified tooling requirements.

Preferably, the plies are laid up using, at least in part, an automated ply deposition technique. For example, an automated tape laying machine (ATL) or fiber placement machine may be used to lay up the majority of the plies of the structural member. It may be more cost effective to lay up the substituted plies by hand. However, it is contemplated that the entire lay up may be automated. For example, where the substituted ply portions comprise the same fiber tape as those of another ply in the lay up there is no difficulty in programming the automated process to make this substitution.

Particularly in the case of an automated lay up, it may be beneficial that the first and second ply portions each comprise unidirectional fibers. However, there is no restriction on the use of, say, woven or mixed fiber plies for the first and/or second portions.

Preferably, the first and second portions are laid up consecutively prior to lay up of the next ply in the stack. However, where a group of plies are being substituted, it may be preferable to lay up all first ply portions in the group before or after laying up all the second ply portions in the group.

The second portion extends up to an edge of the structural member and the first portion is disposed inboard of the edge. Where the structural member is a stringer, the ply substitution may be in the run out region. In one embodiment, one or more plies having fibers oriented substantially in the stringer longitudinal direction have a portion in the run out region substituted with fibers having a different characteristic such that the stringer has a lower axial stiffness at the run out region compared with the remainder of the stringer. Where the structural member is a panel having a man-hole cut out, for example, the ply substitution may be in the region adjacent the cut out. In one embodiment, the panel desirably has high stiffness inboard of the cut out, and lower stiffness, and hence improved damage tolerance, in the region adjacent the cut out.

The ply substitution may be repeated for a plurality of plies or groups of plies through the laminate stack. The transition between the first and second ply portions may be staggered in the through thickness direction of the stack such that any local thickness variation, or reduction in load transfer due to the substitutions is not concentrated in one region of the structural member.

BRIEF DESCRIPTION OF THE DRAWINGS

Embodiments of the invention will now be described with reference to the accompanying drawings, in which:

FIGS. 1a and 1b illustrate section views of a stringer termination fixed to a panel;

FIGS. 2a to 2e illustrate a method of forming the stringer from multiple composite components;

FIG. 3 illustrates the laminate stack for one of the stringer components, in which one of the plies has a substituted portion at its outboard end;

FIG. 4 illustrates the substituted ply in detail;

FIG. 5 illustrates a section view through the flange of the stringer fixed to the panel;

FIG. 6 illustrates a first example of Detail C of FIG. 5, showing abutting substituted ply portions;

FIG. 7 illustrates a second example of Detail C, showing overlapping substituted ply portions;

FIG. 8 illustrates a third example of Detail C, showing multiple plies substituted for a different number of plies;

FIG. 9 illustrates a) a gradual transition to the substituted ply portion; b) an instantaneous transition to the substituted ply portion; and c) a stepped transition to the substituted ply portion;

FIG. 13 illustrates a partially cut away view of an aircraft wing box including a modified wing cover in accordance with this invention, with the broken line around the manhole cover indicating the introduction of ply substitutions to provide limited stiffness reduction at the edge of the wing cover.

DETAILED DESCRIPTION OF EMBODIMENT(S)

Figure 10:
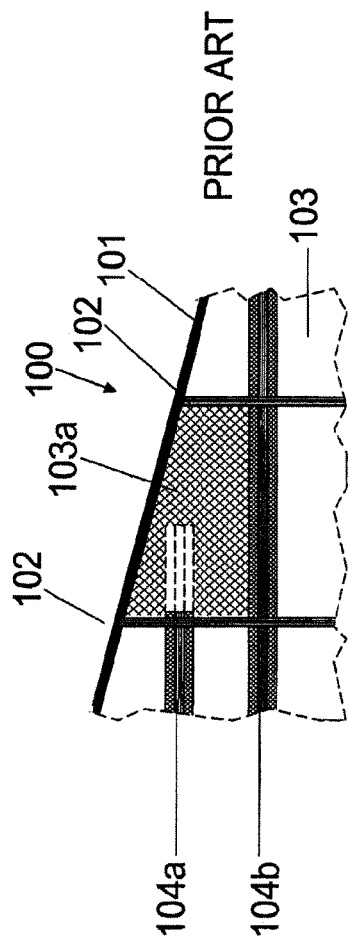
FIG. 10 illustrates a partially cut away view of a prior art aircraft wing box, showing an idealised stringer termination location (broken line), and an imposed stringer termination location accompanied by a thickened skin.

FIGS. 1a and 1b illustrate a "T" section composite stringer 1 comprising a pair of "L" section members 2, 3, a base stack 4 and a central stack 5. FIG. 1b illustrates the cross section view along A-A in FIG. 1a, and FIG. 1a illustrates the cross section view along B-B in FIG. 1b.

The stringer 1 is attached to a laminate composite panel 8 by a bonding line 9 and an array of fasteners 10 of conventional type. The bond line 9 and the fasteners 10 help to transfer load at the stringer termination into the panel 8. Each of the stringer components 2, 3, 4 and 5, comprise a laminate stack of composite structural plies, as will be described in greater detail below. Due to the limited bend radius of the "L" section components 2, and 3, noodles 11 are provided in the cleft between the back-to-back "L" sections 2, 3 and the central stack 5, as best seen in FIG. 1b. The noodles 11 comprise fiber filler material.

Although the stringer 1 shown in FIGS. 1a and 1b includes a base stack 4 and a central stack 5, it will be appreciated by those skilled in the art that these components are optional and that a "T" section stringer may alternatively be formed having only the "L" section back to back components 2, 3, or one of the central stack 5 and the base stack 4 may be omitted. It should also be noted that whilst the specific embodiment described here relates to a "T" section stringer, the same principles of this invention apply similarly to other stringer sections, such as "I" and "L" sections, for example.

The stringer 1 is manufactured by laying up separate stacks to the required specification for the back-to-back "L" sections 2, 3, the central stack 5 and the base stack 4. FIG. 2a illustrates a sample laminate stack 12 of structural plies. A planar laminate stack is required to form each of the base stack 4 and the central stack 5. A further planar laminate stack is required to form each of the "L" sections 2 and 3. The "L" sections are formed by folding the laminate stack 12 along fold line F, as shown in FIGS. 2*b* and 2*c*. The four stringer components 2, 3, 4 and 5 are then assembled as shown in FIG. 2*d* and cured to form the stringer 1 as shown in FIG. 2*e*.

The stacks 12 may be constructed using an automated ply deposition technique. For example, an automated tape laying machine (ATL) or fiber placement machine may be used. However, the stack 12 may equally be laid up by hand.

The ply stack 12 is shown more clearly in FIG. 3 and includes unidirectional fiber plies of various fiber orientations. The fiber orientations can be seen in FIG. 3 for each ply in the stack 12. The orientations shown include 0, +/−45, and 90 degree plies but these are purely exemplary and virtually any suitable orientation may be selected. What is important to note is that the ply "S" includes a substituted portion.

Ply S is shown in greater detail in FIG. 4 and includes a first portion 13 of unidirectional fibers having a zero degree orientation. That is to say, the zero degree fibers are aligned with the stringer longitudinal direction. Ply S also includes a second portion 14 located at the stringer run out. In effect, a portion of the zero degree ply S has been substituted with a ply portion 14 having a different fiber characteristic. In FIG. 4, the substituted ply portion 14 includes fibers of a different orientation to the remainder of ply S. In fact, the second portion 14 shown in FIG. 4 has a ply orientation of +/−45 degrees. By discontinuing the zero degree ply at the stringer termination and substituting it for the second ply portion 14 having a different fiber orientation, the axial stiffness of the stringer is reduced at the stringer termination. The ply portion 14 in this example has identical characteristics to ply portion 13 in all respects, except its orientation. For example, ply portions 13 and 14 may both comprise substantially identical unidirectional fiber reinforced composite material such as intermediate modulus carbon-epoxy of the same laminate thickness.

In this example, it is the zero degree ply which has been selected to include the substituted portion at the stringer termination, since the zero degree ply contributes most to the axial stiffness of the stringer. By making this substitution, the axial stiffness of the stringer at the stringer termination can be reduced, since the +/−45 degree ply portion 14 which is introduced is less stiff in the stringer axial direction. Moreover, making the substitution to the +/−45 degree ply provides the additional benefits of improved bearing strength and torsional stiffness at the stringer termination when compared with the unmodified stringer. Since the ply portion 14 has the same thickness as the ply portion 13, there are no, or minimal, variations in thickness through the stack of plies 12.

FIG. 5 shows a cross section view through the flange 7 of the stringer 1 bonded to the panel 8. As can be seen from FIG. 5, the upstanding web 6 has been cut, after curing the stringer 1 and panel 8, to form a geometric web taper at the stringer termination. Three alternative ply substitution lay ups are shown in FIGS. 6 to 8 for the area marked "Detail C" in FIG. 5. This area covers the upper half of the ply stack of the flange 7 of the stringer 1. The lower half of the stack is essentially a mirror image of the upper half of the stack about mirror plane M.

Turning first to FIG. 6 there is shown an embodiment in which the replacement ply, R, is arranged in abutting, in plane, relationship with the remainder of the 0 degree ply, which it has partially substituted. In the embodiment shown in FIG. 6, two of the 0 degree plies are partially substituted with an abutting replacement ply, R. The ply key is shown in the top right hand corner of FIG. 5. As can be seen from FIG. 6, the stringer run-out has regions I, II and III of progressively decreasing axial stiffness. In region I, the ply layer is the same as the remainder of the stringer, inboard of the run-out. In region II, one of the 0 degree plies is partially substituted with a replacement ply, R. In region III, two of the 0 degree plies have been partially substituted with replacement plies, R. The replacement plies, R, have a lower modulus in the stringer longitudinal direction than the 0 degree ply portions which have been substituted. In this way, the stringer axial stiffness is progressively reduced towards the run-out.

FIG. 7 shows an alternative embodiment in which two of the 0 degree plies have been partially substituted with replacement plies, R, arranged in an edge overlapping manner. At the boundary between regions I and II, one of the 0 degree plies is terminated and the edge of the replacement ply R has a small region of overlap with the remaining 0 degree ply portion. Similarly at the boundary between regions II and III, another of the 0 degree plies is terminated and the edge of the replacement ply, R, has a small region of overlap with the remaining 0 degree ply portion. This results in a gradual decrease in axial stiffness in a similar manner to the embodiment of FIG. 6. The only difference between FIG. 6 and FIG. 7 is that in FIG. 7 the ply substitution is by overlapping the replacement plies, R, and so there is a small, local variation in overall thickness of the ply stack at the boundaries between regions I and II and between regions II and III.

Whilst the overlapping ply substitution shown in FIG. 7 has an advantage of more efficient load transfer within the laminate than the abutting substitution shown in FIG. 6, the uniform stack thickness afforded by the abutting solution has an advantage in terms of simplified tooling. To mitigate the impact on the tooling requirements, the overlapping distance where the ply substitution occurs in the embodiment of FIG. 7 can be controlled so as to minimise local thickness changes. Where multiple ply substitutions are staggered through the ply stack then not only is the axial stiffness of the stringer gradually reduced towards the run-out but this also helps to minimise local thickness changes.

A yet further alternative embodiment of the ply stack lay up of "Detail C" in FIG. 5 is shown in FIG. 8. As can be seen from FIG. 8, the ply substitution forms an abutting arrangement, and there is virtually no local thickness variation, similar to the arrangement shown in FIG. 6. However, the ply stack lay up shown in FIG. 8 differs from that shown in FIG. 6 in that two of the 0 degree plies are terminated at the boundary between region I and region II and are substituted by a replacement ply R having a thickness approximately twice that of the individual 0 degree plies which the replacement ply, R, is substituting.

Although it is preferable that each of the plies in the stack has approximately the same ply thickness, it will be appreciated by those skilled in the art that it may not always be possible to source supplies of different composition having the same ply thickness. In addition, it may in some circumstances be desirable to provide the replacement ply, R, having a different ply thickness. In the embodiment shown in FIG. 8, the replacement ply portion has a lower modulus in the stringer longitudinal direction than the 0 degree ply portions which it is replacing. In this way, the stringer termination may have a lower axial stiffness than the remainder of the stringer inboard of the stringer termination. Of course, it is possible to provide the replacement ply, R, in an overlapping arrangement, in a similar manner to the overlapping arrangement depicted in FIG. 7. Whilst in FIG. 8 the substitution is between two plies and a replacement ply having a thickness approximately twice that of the individual plies which it is replacing, it will be appreciated by those skilled in the art that various other combinations may be possible. For example, four 0.125 mm thick plies may be provided in region I and two replacement 0.25 mm thick plies may be provided in region II.

Returning to FIG. 4, a plan view of the substituted ply S is as viewed on arrow A. This view is reproduced in FIG. 9a). As best seen in FIG. 9a), the first, 0 degree ply portion 13 is terminated at an oblique line with respect to the fiber orientation of the 0 degree ply. The second, replacement ply portion 14 is arranged in abutting relationship with the termination of the first ply portion 13. Making the ply substitution along an oblique line provides a gradual transition between the ply portions 13 and 14 for efficient load transfer between the ply portions. However, it will be appreciated that other arrangements may be provided, as shown in FIGS. 9b) and c).

In FIG. 9b) ply portions 13' and 14' abut along a line substantially orthogonal to the fiber orientation of the 0 degree ply portion 13'. Although the arrangement shown in FIG. 9b) would be less efficient from the point of view of load transfer, it has distinct advantages in terms of ease of manufacture, particularly when the ply stack is laid up automatically, using an automated ply deposition technique. The arrangement shown in FIG. 9c) provides a compromise between ease of automated manufacture and gradual load transfer between the ply portions 13" and 14". As shown in FIG. 9c), the ply substitution occurs along a stepped region. The straight cut edges of the ply portions 13" and 14" are generally perpendicular to the fiber orientation of the zero degree ply portion 13". When the ply lay up is automated using a tape laying machine, the number of steps in the transition may equate to, or be an integer multiple of, the number of tape widths required for the ply lay up.

In a preferred embodiment of the invention, as applied to a stringer, one or more of the 0 degree plies (i.e. having fibers oriented in the stringer longitudinal duration) are substituted at the stringer termination. Various possibilities exist for the replacement ply. For example, some or all of the 0 degree, or near 0 degree, ply orientations may be substituted by a replacement ply of an identical material having the same ply thickness but with a different uniaxial fiber orientation. Advantages of this approach include: improved bearing strength due to the introduction of +/−αo plies, which may remove the requirement for local pad ups to improve reserve factor allowables and so achieve weight savings; no, or minimal, thickness variations across the ply stack, which provides simpler tooling requirements; and improved torsional stiffness.

Alternatively, some or all of the 0 degree, or near 0 degree ply orientations may have a ply portion substituted for a ply portion having lower modulus fibers. The ply thickness, fiber orientation, fiber material and resin matrix material may be identical to that of the original ply. However, by providing the replacement ply having fibers of lower modulus, the axial stiffness of the stringer may be reduced at the stringer termination. For example, the 0 degree plies may be formed of carbon intermediate modulus (IMS) and the replacement ply portions may be formed of carbon high tensile strength (HTS) fibers with reduced stiffness. Substituting for ply portions of lower modulus provides the advantages of: no, or minimal, thickness variations leading to simpler tooling requirements; and limited thermal effects (during cure) due to similar ply properties where identical resins are used. In addition, the replacement plies of lower modulus may be of different orientation. Where the replacement plies are of different orientation, further advantages can include: improved bearing strength of +/−αo plies, which may remove requirements for local pad ups to improve reserve factor allowables; more control of stiffness properties through fiber modulus and orientation variation; and improved torsional stiffness with use of +/−αo plies. In addition, since the replacement plies are from a different material stock, there is the potential to design in thickness variations at the stringer termination, where required, by using different cure ply thicknesses.

In a yet further embodiment, the replacement ply may include fibers of different material. For example, whilst the stringer baseline (i.e. inboard of the termination) may include carbon fiber reinforced plies, the replacement ply portions may include glass fibers. The glass fibers may also be of different orientations, i.e. +/−αo. In addition to the benefits mentioned above, use of glass fibers in the replacement ply portions can lead to improved damage tolerance, improved lightning strike performance, easier machining, and significant stiffness reduction at the stringer termination. Due to the significant stiffness reduction of glass fibers in comparison with carbon fibers, it may be possible, in certain applications, to dispense with the requirement for alternative fiber orientations and instead use a woven glass fiber ply portion leading to a more simplified layup. It is envisaged that lay up of glass fiber ply portions, particularly when these are woven, may be by hand during an otherwise automated, or semi-automated, carbon ply layup.

In a yet further alternative embodiment, the replacement ply portions may include aramid fibers. Substituting carbon plies for aramid fiber plies has similar advantages associated with substitution for glass fiber plies as detailed above.

Figure 12:
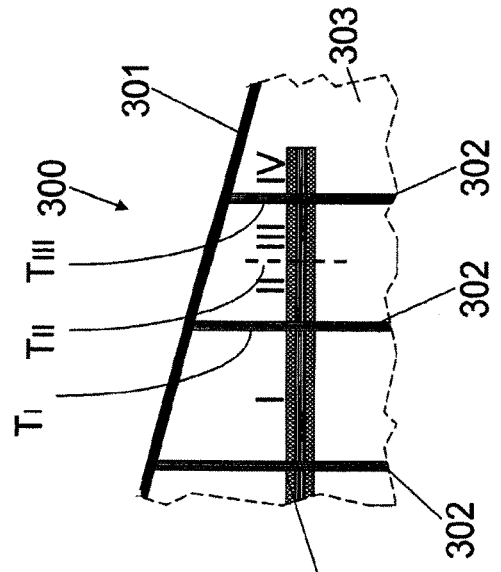
FIG. 12 illustrates a partially cut away view of an aircraft wing box including a second example of a modified stringer in accordance with this invention, with the broken lines indicating the introduction of various ply substitutions to provide significant stiffness reduction at the termination.

The effect of modifying the ply lay up at the stringer termination will now be described in detail with reference to FIGS. 10 to 12. FIG. 10 illustrates a prior art aircraft wing box assembly 100 including a front spar 101, ribs 102, a lower wing cover panel (skin) 103, and reinforcing stiffeners (stringers) 104a and 104b. The stringer 104a is shown having a portion in broken line. This indicates the optimised stringer run out, or termination, position for wing bending loads. However, terminating the stringer 104a so far beyond the rib 102 into the wing cover bay 103a can lead to unacceptably high load transfer between the stringer termination and the cover panel 103a. This is primarily due to the significant mismatch between the stiffness of the wing cover 103a and the composite stringer at its termination location.

As discussed previously, geometric tapering of the composite stringer may alone be insufficient to achieve the desired stiffness match between the stringer termination and the wing cover. As a result, it has previously been necessary to terminate the stringer 104a at the location shown in full line, at or just beyond the rib 102. As a result, the wing cover 103a is insufficiently supported by the stringer 104a and so the wing cover 103a must be thickened as indicated by the hatching in FIG. 10, in comparison with the remainder of the wing cover 103. This sub-optimised solution leads to significant weight penalties.

Figure 11:
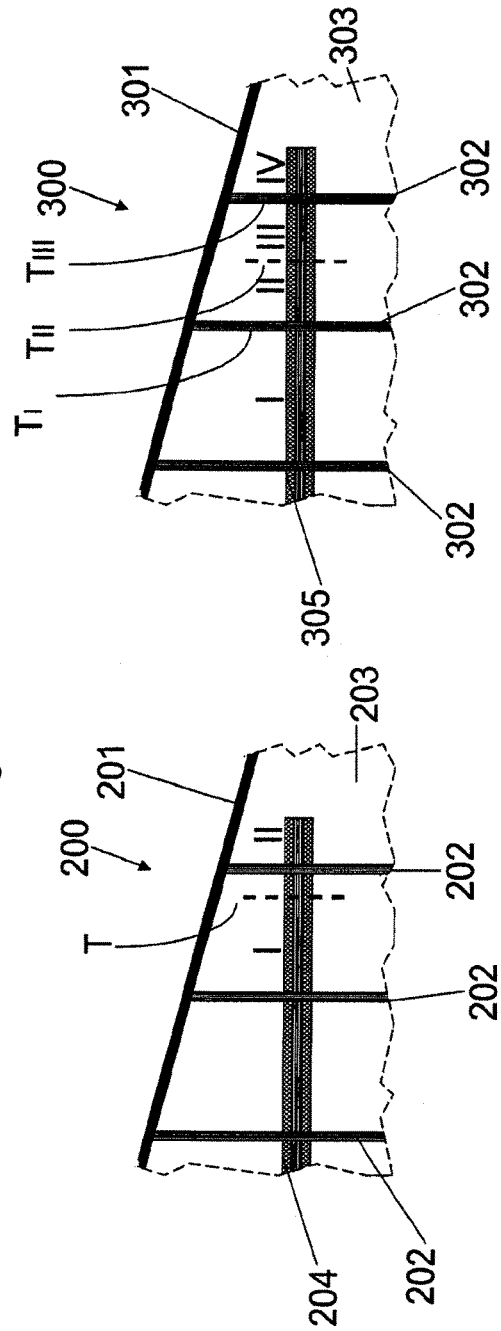
FIG. 11 illustrates a partially cut away view of an aircraft wing box including a first example of a modified stringer in accordance with this invention, with the broken line indicating the introduction of ply substitutions to provide limited stiffness reduction at the termination.

Turning now to FIG. 11, there is shown a portion of aircraft wing box 200 including a front spar 201, ribs 202, a wing cover (skin) 203 and a stringer 204, which is a composite structural member in accordance with the present invention. As can be seen from FIG. 11, the stringer termination is well beyond the location of the outboard rib 202, and the dashed line, T, indicates the transition between the baseline stringer at region I and the modified stringer at the termination region II having substituted plies of a different characteristic. By modifying at least some of the plies to have a different characteristic in region II, it is possible to reduce the axial stiffness of the stringer at the run out, or termination, so as to better match the stiffness of the wing cover 203. The wing cover 203 is now adequately supported by the stringer 204 and so no further stiffening of the wing cover is required (i.e. no skin thickness build up is required).

In some circumstances it may be necessary, or desirable, to gradually reduce the axial stiffness of the stringer towards the termination across a plurality of rib bays. FIG. 12 shows a further embodiment of an aircraft wing box 300 having a front spar 301, ribs 302, a lower wing cover (skin) 303 and a stringer 305, which is a composite structural member in accordance with the present invention. The broken lines TI, TII and TIII indicate the transitions between the various stringer regions I, II, III and IV of progressively decreasing axial stiffness. The number of regions of decreased axial stiffness in the stringer is dependent upon the local loads, and in general, the more highly loaded the baseline stringer the greater the number of regions of decreasing axial stiffness may be required.

Whilst in the embodiments described above the invention has been described as applied to an aircraft stringer, this invention has broader applications to a variety of structural members in aerospace and non-aerospace applications. FIG. 13 shows a portion of an aircraft wing box 400 including a front spar 401, ribs 402 and a lower wing cover (skin) 403. In the wing cover 403 is formed a manhole inspection hatch, including a panel 404. The wing cover 403 is formed of a stack of laminate composite plies. The edge of the wing cover 403 around the manhole panel 404 is particularly susceptible to impact damage. The majority of the wing cover 403 desirably has an optimally high stiffness so as to provide a weight optimised solution with minimal stiffening members, such as stringers. However, the high stiffness of the wing cover 403 leads to a relatively low damage tolerance at its edge around the manhole panel 404.

The current solution adopted in the aircraft industry is to provide structural build up at the edge of the cover 403 around the manhole panel 404. This leads to undesirable weight penalties. In accordance with the present invention, the wing cover 403 has a substituted region 403a, shown within the broken line in FIG. 13. One or more of the composite structural plies which make up the baseline stack for the wing cover 403 are substituted in the region 403a for ply portions having a different characteristic from those of the remainder of the wing cover 403. Desirably, the substituted ply portions have a higher strength, and reduced stiffness, which improves the damage tolerance of the panel at the edge region 403a. In this way, it becomes possible to satisfy the damage tolerance requirements around the cut-out for the manhole panel 404, reducing the requirement for building up the thickness of the wing cover 403 in this region. This provides a significant weight saving.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention is:

1. A longitudinal stringer comprising one or more composite structural members and having a run out region, wherein at least one of the one or more composite members comprises:
   a stack of fibre reinforced laminate plies, wherein at least one of the reinforced laminate plies includes a discrete first ply portion and a discrete second ply portion, and
   fibres of the discrete second ply portion have a different fibre characteristic from fibres of the discrete first ply portion,
   wherein the discrete second ply portion extends up to a longitudinal end of the stringer at the run out region and the discrete first ply portion is disposed inboard of the longitudinal end along a longitudinal direction of the stringer, and
   wherein the stringer has a lower axial stiffness at the run out region compared with an axial stiffness of a remainder of the stringer due to the different characteristic of the fibres of the second ply portion.

2. The stringer according to claim 1, wherein the fiber characteristic is selected from the group comprising: modulus, orientation, and material.

3. The stringer according to claim 1, wherein adjacent edges of the first and second portions are abutting.

4. The stringer according to claim 1, wherein adjacent edges of the first and second portions are overlapping.

5. The stringer according to claim 1, wherein the first and second portions each comprise unidirectional fibers.

6. The stringer according to claim 1, wherein the first and second portions have a similar thickness.

7. The stringer according to claim 1, wherein a plurality of the plies in the stack each include the discrete first and second ply portions.

8. The stringer according to claim 1, wherein the transition between the first and second ply portions is staggered in a through thickness direction of the stack.

9. The stringer according to claim 1, wherein the thickness of the stack is substantially uniform throughout.

10. The stringer according to claim 1, wherein the fibers of the first ply portion are oriented substantially in the stringer longitudinal direction.

* * * * *